(12) United States Patent
Mochizuki

(10) Patent No.: US 9,316,511 B2
(45) Date of Patent: Apr. 19, 2016

(54) THREE-DIMENSIONAL DESIGN SECTION STRUCTURE OF METER FOR AUTOMOBILE

(71) Applicant: YAZAKI CORPORATION, Minato-ku, Tokyo (JP)

(72) Inventor: Yasufumi Mochizuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 210 days.

(21) Appl. No.: 14/208,599

(22) Filed: Mar. 13, 2014

(65) Prior Publication Data

US 2014/0261153 A1 Sep. 18, 2014

(30) Foreign Application Priority Data

Mar. 15, 2013 (JP) ................. 2013-053877

(51) Int. Cl.
*G01D 13/04* (2006.01)
*G01D 13/20* (2006.01)
*G01D 11/28* (2006.01)

(52) U.S. Cl.
CPC ............... *G01D 11/28* (2013.01); *G01D 13/04* (2013.01)

(58) Field of Classification Search
CPC ....... G01D 11/28; G01D 13/02; G01D 13/04; G01D 13/12; G01D 13/18; G01D 13/20
USPC ........ 116/286, 287, 334, DIG. 36; 362/23.01, 362/23.12, 23.13, 23.19, 23.2, 23.21
See application file for complete search history.

(56) References Cited

U.S. PATENT DOCUMENTS

| 4,911,096 | A | * | 3/1990 | Munakata | ......... | B29C 45/14688 |
| | | | | | | 116/28.1 |
| 2006/0185576 | A1 | * | 8/2006 | Tane | ...................... | G01D 11/28 |
| | | | | | | 116/288 |
| 2009/0103278 | A1 | * | 4/2009 | Miyashita | .............. | B60K 37/02 |
| | | | | | | 362/23.18 |
| 2015/0096487 | A1 | * | 4/2015 | Mochizuki | ............. | G01D 13/12 |
| | | | | | | 116/286 |

FOREIGN PATENT DOCUMENTS

| JP | 2010-078442 | A | | 4/2010 | | |
| JP | 2011-013154 | A | | 1/2011 | | |
| JP | 2011043498 | A | * | 3/2011 | ............. | G01D 13/04 |
| JP | 5533595 | B2 | * | 6/2014 | ............. | G01D 11/28 |
| WO | WO 2012084122 | A2 | * | 6/2012 | ............. | B60K 37/02 |

\* cited by examiner

*Primary Examiner* — R. A. Smith

(74) *Attorney, Agent, or Firm* — Sughrue Mion, PLLC

(57) ABSTRACT

A three-dimensional design section structure of a meter for automobile includes a dial; a prism disposed on a rear surface of the dial and from a base end side of which a light emitted from light sources is incident; three-dimensional scales disposed in a protruding manner at a leading end side of the prism and configured to protrude via through holes perforated in the dial; recesses formed encompassing the three-dimensional scales on a light-guiding-body rear surface, which faces an opposite side to the dial, of the prism; and color printing configured to be applied including the recess so as to encompass the three-dimensional scales on the light-guiding-body rear surface.

4 Claims, 5 Drawing Sheets

THREE-DIMENSIONAL DESIGN SECTION STRUCTURE OF METER FOR AUTOMOBILE

CROSS-REFERENCE TO RELATED APPLICATIONS

The present application claims priority to and incorporates by reference the entire contents of Japanese Patent Application No. 2013-053877 filed in Japan on Mar. 15, 2013.

BACKGROUND OF THE INVENTION

1. Field of the Invention

The present invention relates to a three-dimensional design section structure of a meter for automobile.

2. Description of the Related Art

There are meters for automobile which are devised to enhance the visibility of the dial (for example, see Japanese Patent Application Laid-open No. 2010-78442).

As a technology of this type, a three-dimensional scale structure (a three-dimensional design section structure) of a meter for automobile is known in which, as illustrated in FIGS. 5 and 6, three-dimensional scales 505a and 505b (three-dimensional design section) that are protruding in nature are disposed on a prism (a light guiding body) 503. The prism 503 is placed on the undersurface of a dial 501 for the purpose of illuminating the dial 501. The three-dimensional scales 505a and 505b protrude via through holes formed on the dial 501. According to this constitution, the three-dimensional scale structure enhances the visibility by the light guided to the three-dimensional scales 505a and 505b.

The prism 503 is housed in a meter case 509. The outside of the three-dimensional scales 505a and 505b in the radial direction are covered by a decorated ring 511. On the rear surface of the dial 501, light sources (not illustrated) of white light are disposed for the purpose of illuminating the entire dial as well as illuminating the three-dimensional scales 505a and 505b. That is, a primary color illumination light 513 used for illuminating the entire dial 501 represents the same white light as the primary color illumination light 513 used for illuminating the three-dimensional scales 505a and 505b.

In this type of three-dimensional scale structure, regarding the red zone of the tachometer, the light exiting from the three-dimensional scales 505a is supposed to be a colored light 515 that is colored with red color. For that, in a red-color-light requiring portion on the rear surface of the prism 533 (i.e., in a portion on the rear surfaces of the three-dimensional scales 505a), solid coating of red color printing 517 is applied as illustrated in FIG. 6. Moreover, on the front surface of the dial 501, auxiliary scales 519a and 519b are separately printed in red color in between through holes 507 with the aim of enabling visibility of the red color during daylight too. Meanwhile, the colored light 515 that is guided by the prism 503 and that is reflected from the red color printing 517 is made to reflect at a different angle than the normal line of the reflecting surface using a diffusing surface.

However, in the conventional three-dimensional scale structure described above, the primary color illumination light 513, which is the direct light having white color and which is used for illuminating the entire dial 501, exits without being reflected from the red color printing 517 applied on the rear surface of the prism 503. As a result, the primary color illumination light 513 becomes visible from the three-dimensional scales 505a that are intended to be red in color in the red zone. Moreover, when the auxiliary scales 519a and 519b are printed in red color in between the through holes 507 of the dial 501 with the aim of enabling visibility of the red color on the dial 501 during daylight too, the transmitted light of the auxiliary scales 519a present in the area corresponding to the red color printing 517 has different color shades than the transmitted light of the auxiliary scales 519b present in the area not corresponding to the red color printing 517.

SUMMARY OF THE INVENTION

It is an object of the present invention to at least partially solve the problems in the conventional technology.

According to first aspect of the present invention, a three-dimensional design section structure of a meter for automobile includes a dial; a light guiding body disposed on a rear surface of the dial and from a base end side of which a light emitted from a light source is incident; a three-dimensional design section disposed in a protruding manner at a leading end side of the light guiding body and configured to protrude via a through hole perforated in the dial; a recess formed encompassing the three-dimensional design section on a light-guiding-body rear surface, which faces an opposite side to the dial, of the light guiding body; and color printing configured to be applied including the recess so as to encompass the three-dimensional design section on the light-guiding-body rear surface.

According to the configuration of the three-dimensional design section structure of a meter for automobile described above in the first aspect of the present invention, on the light-guiding-body rear surface corresponding to the three-dimensional design section, the recesses are formed to encompass the three-dimensional scales. When color printing is applied including the recesses so as to encompass the three-dimensional scales, the color printing is made to protrude like an erected wall from the light-guiding-body rear surface toward the inside of the light guiding body.

Therefore, at the base end side of the light guiding body, the color printing formed like an erected wall serves as an erected shielding portion. As a result, the direct light, which is emitted from the light sources and which conventionally used to exit from the three-dimensional design section without getting reflected from the color printing, is blocked. As a result, it becomes possible to prevent a situation in which the direct light emitted from the light sources gets mixed with the colored light, which is the reflected light. Hence, only the light having the color close to the color printing exits from the three-dimensional design section. Thus, a display with excellent visibility can be achieved with a simple configuration. Moreover, when the three-dimensional design section is seen from the side of the dial, a primary color reflection area of the direct light that could be seen in the conventional case is not visible any more due to the blinder effect caused by the erected shielding portion. As a result, it becomes possible to achieve a display having an eye-pleasing appearance.

Furthermore, at the leading end of the light guiding body, the color printing formed like an erected wall serves as an erected color portion. Hence, the direct light, which used to act as stray light in the conventional case and could not be made to exit from the three-dimensional design section, can be made to exit in the form of the colored light.

Moreover, the recesses are formed as annular grooves encompassing the three-dimensional design section. That is desirable on the grounds that the cross-sectional area of the light guiding path of the light guiding body is not reduced. Alternatively, the recesses can be formed in such a way that the entire portion encompassed by each groove is recessed in nature. In that case, when seen from the side of the light-guiding-body rear surface, the color printing is applied on the bottom surface of the recesses. Hence, the color printing gets separated from a meter case and can be protected from aged deterioration.

According to second aspect of the present invention, in the three-dimensional design section structure of the meter for automobile, on a surface of the dial in between the through holes via which a plurality of the three-dimensional design sections protrude, an auxiliary design on which color printing is applied is formed.

According to the configuration of the three-dimensional design section structure of a meter for automobile described above in the second aspect of the present invention, an auxiliary design on which the color printing is applied can also be formed on the surface of the dial in between the through holes via which the three-dimensional design section protrudes. In that case too, it can be ensured that the color printing applied on the light-guiding-body rear surface has a minimal effect on the auxiliary design during night-time illumination. Hence, it becomes possible to hold down the difference in color shades in a plurality of auxiliary designs, thereby making it possible to achieve a display having an eye-pleasing appearance.

According to third aspect of the present invention, in the three-dimensional design section structure of the meter for automobile, the light source emits a primary color illumination light having same color as that of a light emitted by another light source for illuminating the dial in entirety.

According to the configuration of the three-dimensional design section structure of a meter for automobile described above in the third aspect of the present invention, the light sources for illuminating the entire dial as well as the light sources for illuminating the three-dimensional design section emit the primary color illumination light of the same color. With that, it becomes possible to share components in common, thereby enabling achieving an inexpensive structure.

Given above is the brief explanation of the present invention. In addition, by reading through the following explanation of an illustrative embodiment (hereinafter, referred to as "embodiment") of the present invention with reference to the accompanying drawings, the details of the present invention would become clearer.

DETAILED DESCRIPTION OF THE PREFERRED EMBODIMENTS

An exemplary embodiment of the present invention is described below with reference to the accompanying drawings.

Figure 1:
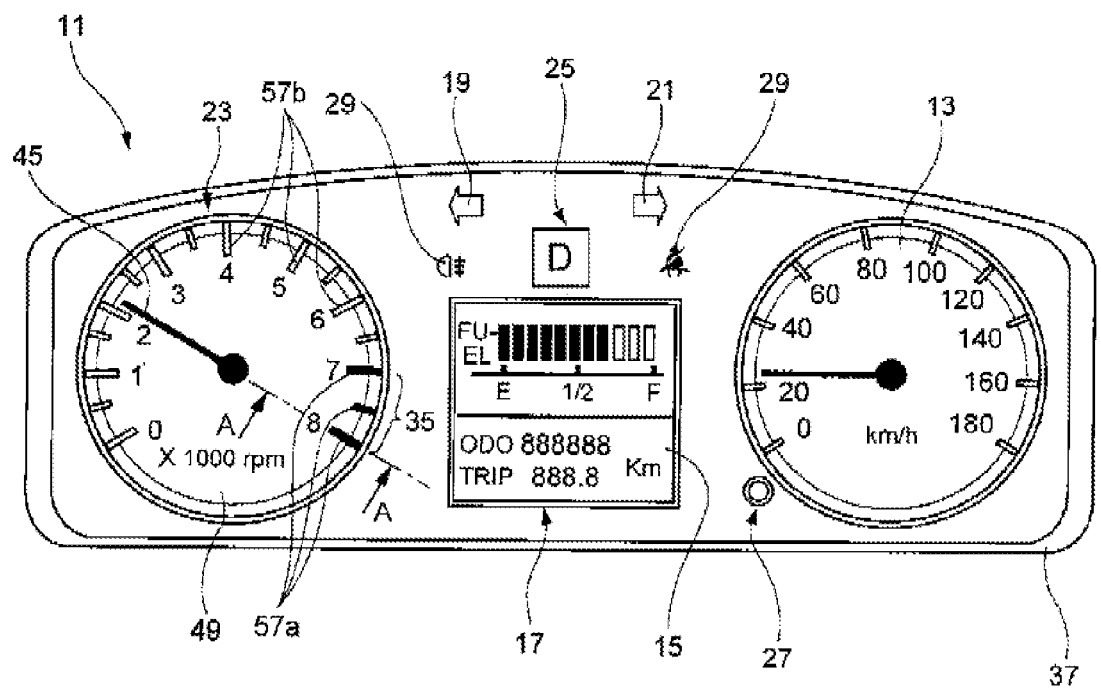
FIG. 1 is a front view of a meter for automobile that includes a three-dimensional design section structure according to an embodiment of the present invention.

As illustrated in FIG. 1, a three-dimensional scale structure, which is a three-dimensional design section structure according to the embodiment of the present invention, can be suitably used in a combination meter 11 that is a meter for automobile. The combination meter 11 is attached to, for example, an installment panel (not illustrated) of a vehicle. As illustrated in FIG. 1, the combination meter 11 is equipped with a speedometer 13 that indicates the speed of the vehicle; a multiple display unit 17 such as a liquid crystal display (LCD) device using a liquid crystal plate 15; a left turn display unit 19; a right turn display unit 21; a tachometer 23 that displays the number of revolutions of the engine; a shift indicator 25; a TRIP knob 27; and a warning lamp 29 used to indicate that the seatbelt is not fastened or to indicate that the headlamps are not turned OFF.

The speedometer 13, the multiple display unit 17, the left turn display unit 19, the right turn display unit 21, the tachometer 23, the shift indicator 25, and the TRIP knob 27 are housed in a meter case 31 of the combination meter 11. On a dial 49 of the tachometer 23, in a display portion for displaying the revolutions equal to and greater than a predetermined number of revolutions, a red zone (a warning area) 35 is formed that includes auxiliary scales 33 (see FIG. 3) which represent a colored auxiliary design. On the front surface of the meter case 31, a flap 37 is attached. The flap 37 hides light sources 39 housed in the meter case 31, hides a wiring substrate 43 on which electronic components 41 are installed, and hides a drive unit 47 of a pointer 45. Meanwhile, on the front surface side of the meter case 31, a front-side glass is attached.

The dial 49 can be made of a light-blocking resinous material or a translucent resinous material. For example, the dial 49 can be made of polycarbonate resin or acrylic resin. In that case, in the non-translucent portion of the dial 49, a non-translucent colored layer is formed. The pointer 45 that moves at the front surface side of the dial 49 is made of a translucent resinous material, and can have a light guiding structure and a reflection structure.

Figure 2:
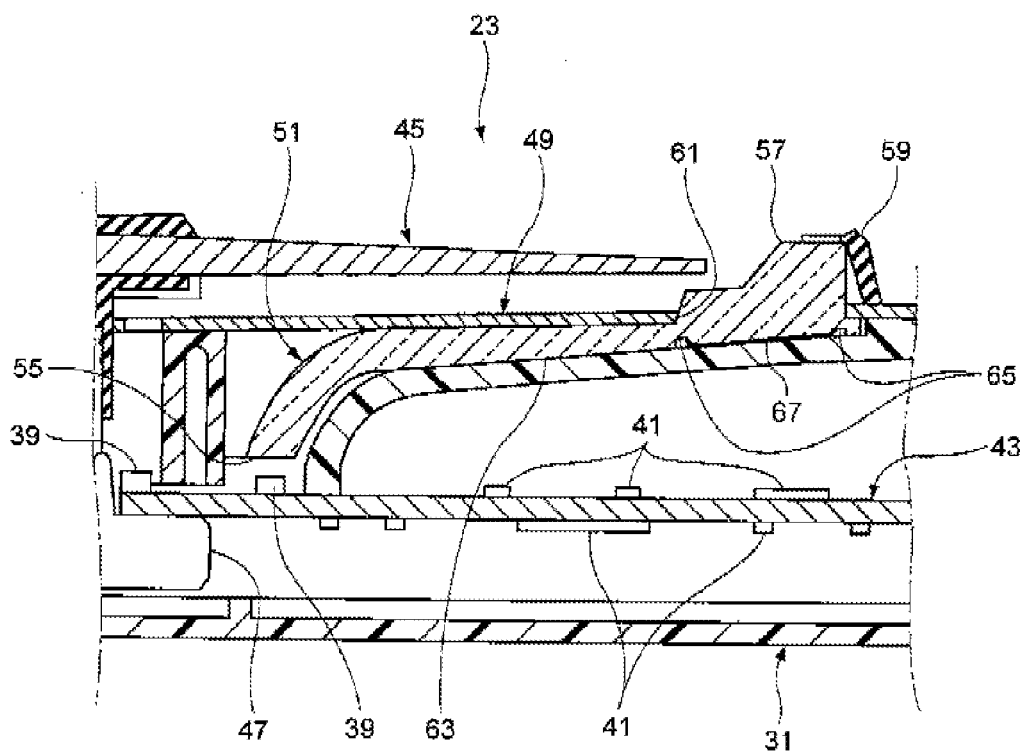
FIG. 2 is a cross-sectional view of the meter for automobile along line A-A illustrated in FIG. 1.

As illustrated in FIG. 2, on the rear surface of the dial 49 of the tachometer 23, a prism 51 is disposed that functions as a light guiding body. The light emitted from the light sources 39 is incident from the base end side to the prism 51. In the present embodiment, a plurality of light sources 39 is installed on the wiring substrate 43. These light sources 39 emit a primary color illumination light 53 (see FIG. 4), which is the direct light having white color.

The light sources 39 are configured with, for example, light emitting diodes, and are driven when a voltage is applied thereto by a control unit installed on the wiring substrate 43. The light sources 39 display the pointer 45 in a luminescent manner as well as indirectly illuminate some portion of the display screen of the dial 49. The light sources 39 are arranged close to an incidence portion 55 at the base end side of the prism 51. Herein, it is possible to place a light diffusion sheet made of a resinous material in between the light sources 39 and the dial 49 as well as in between the prism 51 and the meter case 31. Because of the light diffusion sheet, the light emitted from the light sources 39 is evened out before illuminating the dial 49 and the prism 51. As a result, it becomes possible to curb the unevenness in the luminance.

Figure 3:
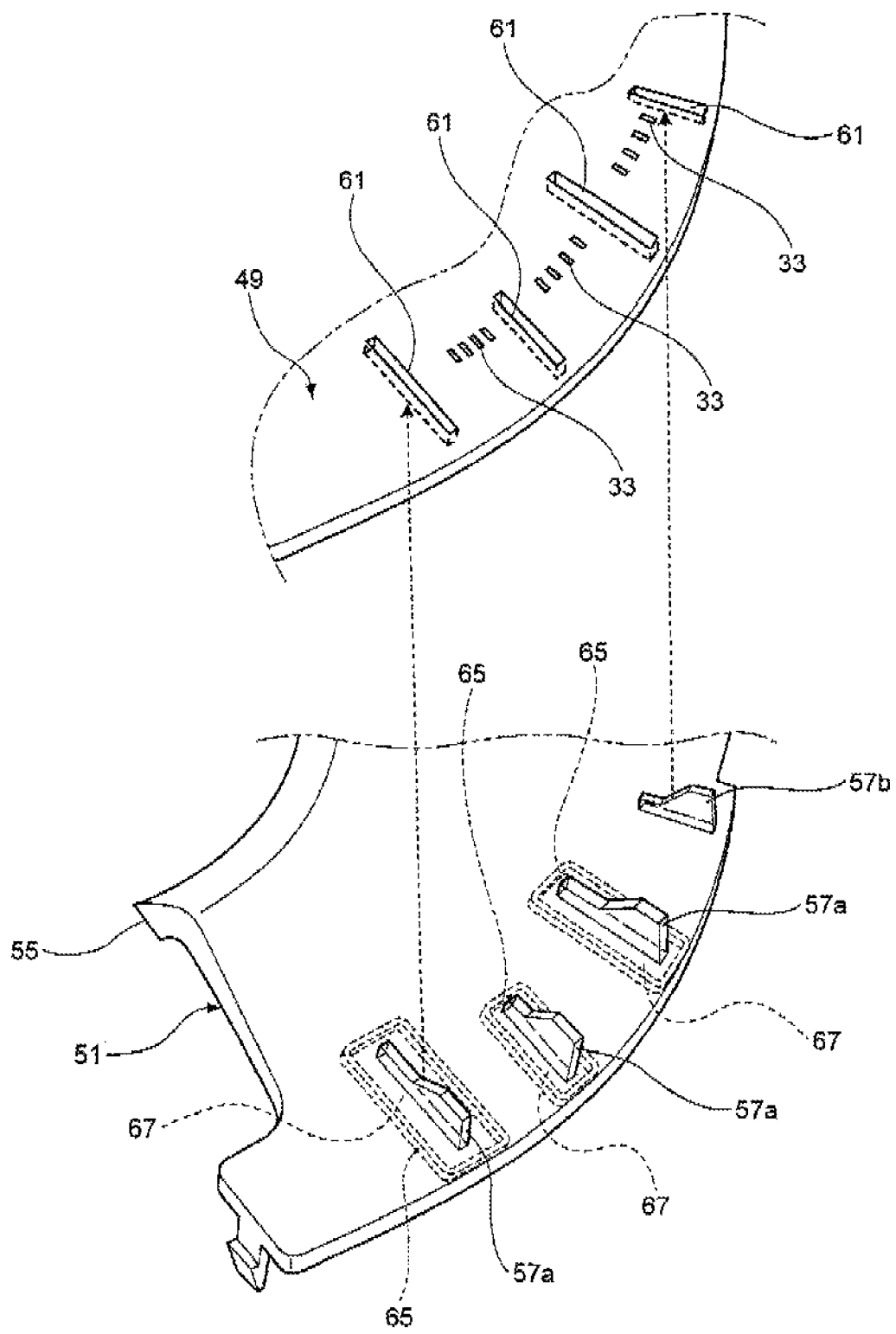
FIG. 3 is a perspective view of the main part of a dial and a light guiding body illustrated in FIG. 2.
Figure 4:
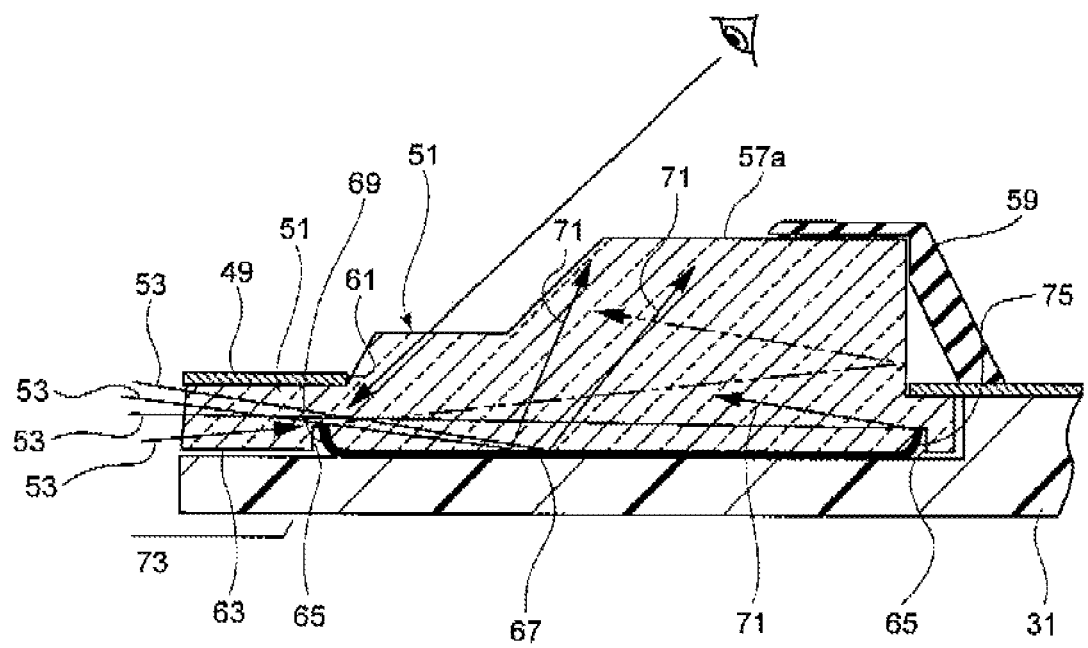
FIG. 4 is an enlarged view of the main part of FIG. 2.
Figure 5:
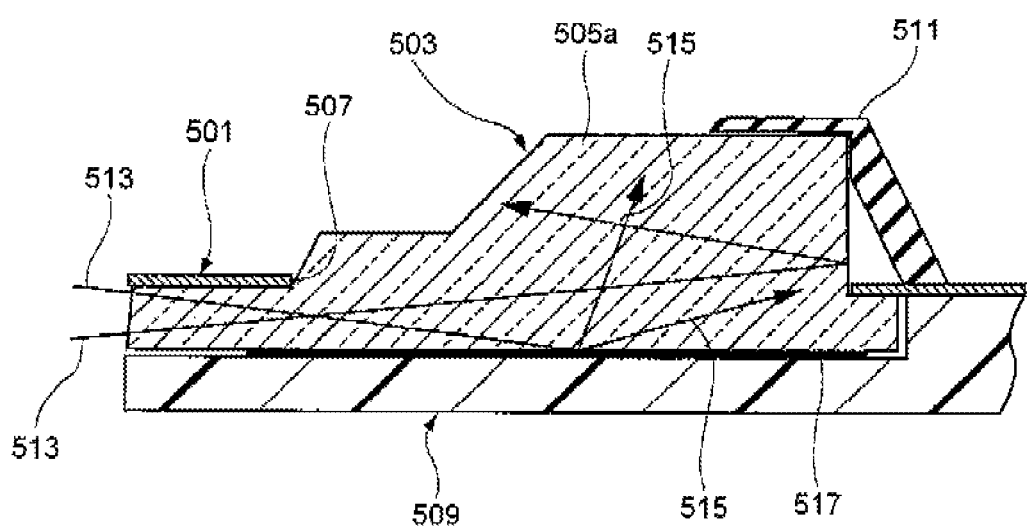
FIG. 5 is an enlarged cross-sectional view of the main part of a three-dimensional scale structure in a conventional meter for automobile.
Figure 6:
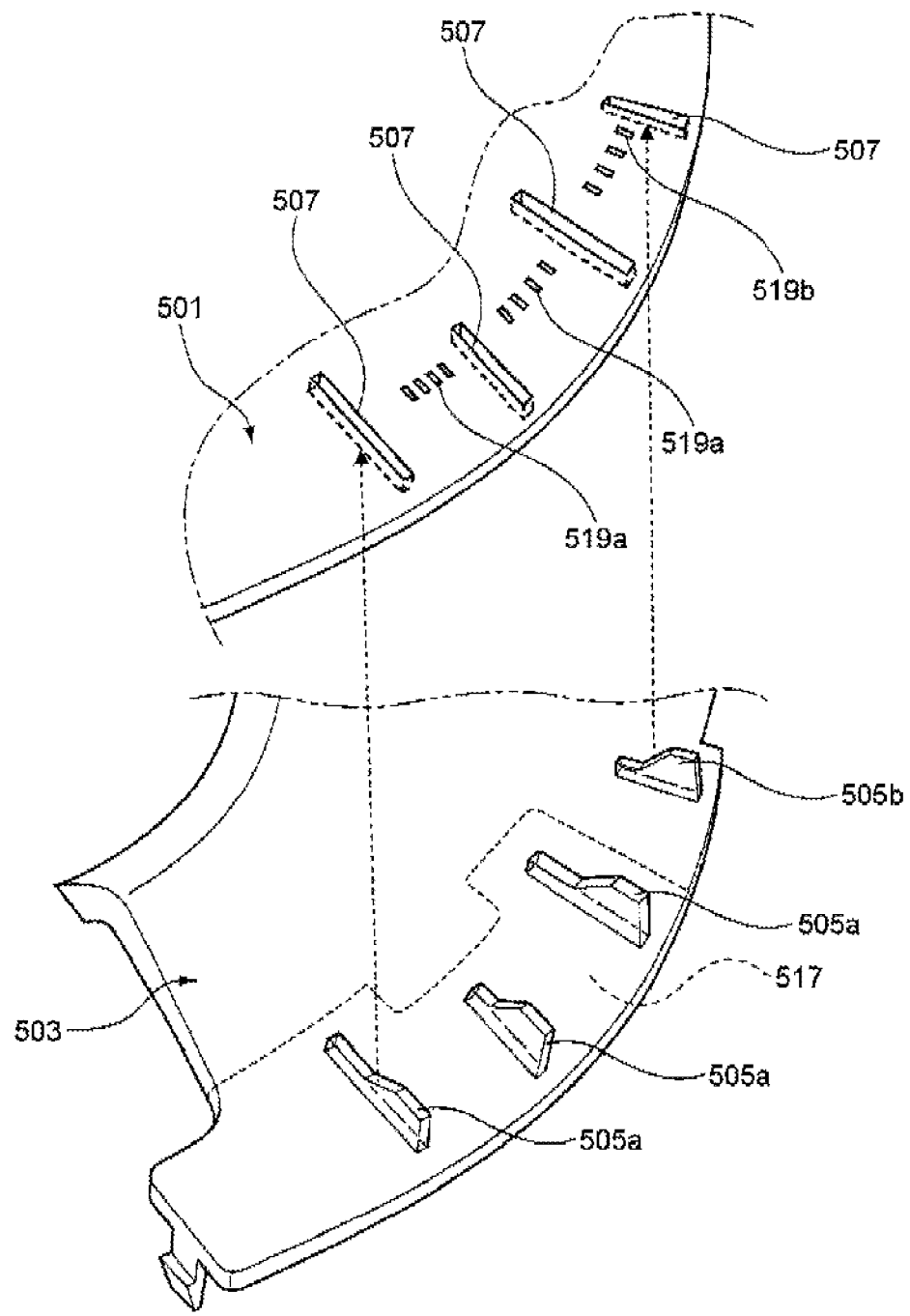
FIG. 6 is a perspective view of a dial and a light guiding body illustrated in FIG. 5.

At the leading end side of the prism 51, three-dimensional scales 57a and 57b, which represent a three-dimensional design section, are disposed in an integrated and protruding manner. The outside of the three-dimensional scales 57a and 57b in the radial direction are covered by a decorated ring 59. The three-dimensional scales 57a protrude via through holes 61, which are perforated within the red zone 35 of the dial 49, and are pointed by the pointer 45. In the present embodiment, a plurality of three-dimensional scales 57a is placed in the red zone 35. Moreover, on the dial 49, the auxiliary scales 33 are disposed (see FIG. 3) in between the protruded three-dimensional scales 57*a*. The auxiliary scales 33 are applied a color printing such as red color printing. The three-dimensional scales 57*b* protrude from the through holes 61, which are perforated on the outside of the red zone 35 of the dial 49, and are pointed by the pointer 45. As illustrated in FIG. 4, the three-dimensional scales 57*a* and 57*b* are formed in a staircase pattern on a trapezoidal plate having steps. However, that is not the only possible case.

On a light-guiding-body rear surface 63 of the prism 51, which faces to the opposite side to the dial 49 and the three-dimensional scales 57*a*, recesses 65 are formed. As illustrated in FIG. 3, the recesses 65 are annular grooves and are formed encompassing the three-dimensional scales 57*a* when the three-dimensional scales 57*a* are viewed from the side of the light-guiding-body rear surface 63.

Moreover, in the red zone 35 on the light-guiding-body rear surface 63, color printing such as red color printing 67 is applied. As illustrated in FIG. 4, the red color printing 67 is applied including the recess 65 so as to encompass the three-dimensional scales 57*a*. In other words, the red color printing 67 is applied in the recess 65 so as to encompass the three-dimensional scales 57*a*. Furthermore, the red color printing 67 is applied inside from the outer edge of the recesses 65 which encompassing the three-dimensional scales 57*a* when the three-dimensional scales 57*a* are viewed from the side of the light-guiding-body rear surface 63.

Given below is the explanation about the mechanism of the three-dimensional scale structure having the configuration described above.

In the three-dimensional scale structure of the combination meter 11 according to the present embodiment, on the light-guiding-body rear surface 63 of the three-dimensional scales 57*a*, the recesses 65 are formed to encompass the three-dimensional scales 57*a*. Moreover, the red color printing 67 is applied including the recess 65 so as to encompass the three-dimensional scales 57*a*. As a result, as illustrated in FIG. 4, the red color printing 67 is made to protrude like an erected wall from the light-guiding-body rear surface 63 toward the inside of the prism 51.

Therefore, at the base end side of the prism 51, the red color printing 67 formed like an erected wall serves as an erected shielding portion 69. As a result, the primary color illumination light 53, which is the direct light emitted from the light sources 39 and which conventionally used to exit from the three-dimensional scales 57*a* without getting reflected from the red color printing 67, is blocked by the erected shielding portion 69. Therefore, it becomes possible to prevent a situation in which the primary color illumination light 53, which is the direct light emitted from the light sources 39, gets mixed with a colored light 71, which is the reflected light. With that, only the light having the color close to the red color printing 67 exits from the three-dimensional scales 57*a*. Consequently, a display with excellent visibility can be achieved with a simple configuration.

Moreover, when the three-dimensional scales 57*a* are seen from the side of the dial 49 (from the side of a person present is inside the vehicle), a primary color reflection area 73 of the primary color illumination light 53 that could be seen in the conventional case is not visible any more due to the blinder effect caused by the erected shielding portion 69. As a result, it becomes possible to achieve a display having an eye-pleasing appearance.

Moreover, at the leading end of the prism 51, the red color printing 67 formed like an erected wall serves as an erected color portion 75. Hence, the primary color illumination light 53, which used to act as stray light in the conventional case and could not be made to exit from the three-dimensional scales 57*a*, can be made to exit in the form of the colored light 71.

Meanwhile, in the present embodiment, the recesses 65 are formed as annular grooves encompassing the three-dimensional scales 57*a*. That is desirable on the grounds that the cross-sectional area of the light guiding path of the prism 51 is not reduced. Alternatively, the recesses can be formed in such a way that the entire portion encompassed by each groove is recessed in nature. In that case, when seen from the side of the light-guiding-body rear surface 63, the red color printing 67 is applied on the bottom surface of the recesses. Hence, the red color printing 67 gets separated from the meter case 31 and can be protected from aged deterioration.

Moreover, in the three-dimensional scale structure of the combination meter 11 according to the present embodiment, even in the case in which the auxiliary scales 33 on which the red color printing 67 is applied are formed on the surface of the dial 49 in between the through holes 61 via which the three-dimensional scales 57*a* protrude. In that case too, it can be ensured that the red color printing 67 applied on the light-guiding-body rear surface 63 has a minimal effect on the auxiliary scales 33 during night-time illumination. Hence, it becomes possible to hold down the difference in color shades in a plurality of auxiliary scales 33, thereby making it possible to achieve a display having an eye-pleasing appearance.

Furthermore, in the three-dimensional scale structure of the combination meter 11 according to the present embodiment, the light sources 39 for illuminating the entire dial 49 as well as the light sources 39 for illuminating the three-dimensional scales 57*a* emit the primary color illumination light 53 of the same color. With that, it becomes possible to share components in common, thereby enabling achieving an inexpensive structure.

In the embodiment described above, the explanation is given about a case in which the three-dimensional design section structure is applied to the red zone 35 of the tachometer 23. In addition to that, the three-dimensional design section according to the present invention can also adapted in three-dimensional design sections having different colors, such as in a green zone for eco-display or in a display unit for displaying electrical drive force and engine drive force ratio. In that case too, it becomes possible to achieve the same effect as described above. Meanwhile, the auxiliary design according to the present invention is not limited to the auxiliary scales 33, and can alternatively be applied to sections having different colors than the color of the three-dimensional design section.

In this way, with the three-dimensional scale structure of the combination meter 11 according to the present embodiment, a display having an eye-pleasing appearance can be achieved using an inexpensive structure.

Meanwhile, the present invention is not limited to the embodiment described above and it is possible to implement various modifications and improvements within the scope of the invention. Besides, the material, the shape, the dimension, the number, and the arrangement location of each constituent element according to the embodiment described above can be set in an arbitrary manner within the scope of the invention.

Meanwhile, the present invention is not limited to the embodiment described above and it is possible to implement various modifications and improvements within the scope of the invention. Besides, the material, the shape, the dimension, the number, and the arrangement location of each constituent element according to the embodiment described above can be set in an arbitrary manner within the scope of the invention.

What is claimed is:

1. A three-dimensional design section structure of a meter for automobile comprising:
   a dial;
   a light guiding body disposed on a rear surface of the dial and from a base end side of which a light emitted from a light source is incident;
   a three-dimensional design section disposed in a protruding manner at a leading end side of the light guiding body and configured to protrude via a through hole perforated in the dial;
   a recess formed encompassing the three-dimensional design section on a light-guiding-body rear surface, which faces an opposite side to the dial, of the light guiding body; and
   color printing configured to be applied including the recess so as to encompass the three-dimensional design section on the light-guiding-body rear surface.

2. The three-dimensional design section structure of the meter for automobile according to claim 1, wherein
   on a surface of the dial in between the through holes via which a plurality of the three-dimensional design sections protrude, an auxiliary design on which color printing is applied is formed.

3. The three-dimensional design section structure of the meter for automobile according to claim 2, wherein
   the light source emits a primary color illumination light having same color as that of a light emitted by another light source for illuminating the dial in entirety.

4. The three-dimensional design section structure of the meter for automobile according to claim 1, wherein
   the light source emits a primary color illumination light having same color as that of a light emitted by another light source for illuminating the dial in entirety.

* * * * *